United States Patent
Lee et al.

(10) Patent No.: US 10,928,326 B2
(45) Date of Patent: Feb. 23, 2021

(54) SELECTIVE COLORIMETRIC DETECTION SENSOR AND SELECTIVE COLORIMETRIC DETECTION METHOD FOR DETECTING HEXAVALENT CHROMIUM IONS USING SIZE CONTROLLED LABEL-FREE GOLD NANOPARTICLES

(71) Applicant: KOREA INSTITUTE OF SCIENCE AND TECHNOLOGY, Seoul (KR)

(72) Inventors: Kangbong Lee, Seoul (KR); Yunsik Nam, Seoul (KR); Kwonchul Noh, Seoul (KR); Inhwan Oh, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 154 days.

(21) Appl. No.: 15/224,195

(22) Filed: Jul. 29, 2016

(65) Prior Publication Data
US 2017/0038303 A1 Feb. 9, 2017

(30) Foreign Application Priority Data
Aug. 3, 2015 (KR) .................. 10-2015-0109660

(51) Int. Cl.
*G01N 21/80* (2006.01)
*G01N 31/22* (2006.01)
*G01N 21/77* (2006.01)

(52) U.S. Cl.
CPC .......... *G01N 21/80* (2013.01); *G01N 31/221* (2013.01); *G01N 2021/7783* (2013.01)

(58) Field of Classification Search
CPC .......... G01N 21/80; G01N 2021/7783; G01N 31/221
See application file for complete search history.

(56) References Cited

U.S. PATENT DOCUMENTS

2010/0068817 A1\* 3/2010 Mirkin ................ C12Q 1/6813
436/80
2011/0008898 A1 1/2011 Yamauchi et al.
(Continued)

FOREIGN PATENT DOCUMENTS

CN 102519948 B 5/2014
CN 103983638 B 8/2016
(Continued)

OTHER PUBLICATIONS

Non-aggregation based label free colorimetric sensor for the detection of Cr(VI) based on selective etching of gold nanorods. Fei-Ming Li, Jia-Ming Liu, Xin-Sing Wang, Li-Ping Lin, Wen-Lian Cai, Xuan Lin, Yi-Na Zeng, Zhi-Ming Li, Shao-Qin Lin Sensors and Actuators B 155, 2011, 817-822 (Year: 2011).\*
(Continued)

*Primary Examiner* — Brian R Gordon
*Assistant Examiner* — Dwan A Gerido
(74) *Attorney, Agent, or Firm* — Goldilocks Zone IP Law (57) ABSTRACT

Disclosed are a selective colorimetric detection sensor and a colorimetric detection method for $C^{6+}$ ions using size controlled label-free gold nanoparticles, which may be useful for the detection of toxic materials such as heavy metal ions in the environmental sector and the industry. Selective colorimetric sensor solution used therein is selectively reacted with only $Cr^{6+}$ ions in trivalent chromium ions ($Cr^{3+}$) and hexavalent chromium ions ($Cr^{6+}$), and there is no interference effect resulting from other metal ions, and it is possible to very rapidly and precisely detect $Cr^{6+}$ ions compared to the related art.

8 Claims, 9 Drawing Sheets

(56) References Cited

U.S. PATENT DOCUMENTS

2013/0052743 A1     2/2013    Gozum
2014/0377876 A1   12/2014   Lee et al.

FOREIGN PATENT DOCUMENTS

| JP | 2015-83971 A | 4/2015 |
| KR | 10-2013-0034214 A | 4/2013 |
| KR | 10-2015-0083701 A | 7/2015 |
| KR | 10-1578691 B1 | 12/2015 |
| KR | 10-2016-0011514 A | 2/2016 |

OTHER PUBLICATIONS

Selective detection of nanomolar Cr(VI) in aqueous solution based on 1,4-dithiothreitol functionalized gold nanoparticles Feng Tan, Xue Liu, Xie Quan, Jingwen Chen, Xiaona Li, and Hongxia Zhao Anal. Methods, 2011, 3, 343-347 (Year: 2011).*

Highly selective and sensitive detection of Cr6+ ions using size-specific label-free gold nanoparticles Rajalakshmi Kanagaraj, Yun-Sik Nam, Sung Jin Pai, Sang Soo Han, Kang-Bong Lee Sensors and Actuators B 251 (2017) 683-691 (Year: 2017).*

Seeding Growth for Size Control of 5-40 nm Diameter Gold Nanoparticles Nikhil R. Jana, Latha Gearheart, Catherine J. Murphy Langmuir 2001, 17, 6782-6786 (Year: 2001).*

Liang Zhao et al. Novel, highly selective detection of Cr(III) in aqueous solution based on a gold nanoparticles colorimetric assay and its application for determining Cr(VI), Analytica Chimica Acta, Apr. 25, 2012, pp. 75-81, vol. 731, Elsevier.

Xi Liu et al., Colloidal gold nanoparticle probe-based immunochromatographic assay for the rapid detection of chromium ions in water and serum samples, Analytica Chimica Acta, Jul. 7, 2012, pp. 99-105, vol. 745, Elsevier.

Yong Liu et al., Colorimetric speciation of Cr(III) and Cr(VI) with a gold nanoparticle probe, Analytical Methods, 2013, pp. 1442-1448, vol. 5, RSC Publishing.

Henry A. Schroeder et al. Abnormal Trace Metals in Man-Chromiun, Journal of chronic diseases, 1962, pp. 941-964, vol. 15.

Dhiraj Kumar et al. Controlling the Size and Size Distribution of Gold Nanoparticles:A Design of Experiment Study, International Journal of Nanoscience, Mar. 28, 2012, pp. 1250023-7 (7 pages), vol. 11, No. 2.

Xiaokun Wang et al., Red -to-blue colorimetric detection of chromium via Cr (III)-citrate chelating based on Tween 20-stabilized gold nanoparticles, Colloids and Surfaces A Physicochem.Eng. Aspects, 2015, pp. 57-52, vol. 472, Elsevier.

* cited by examiner

SELECTIVE COLORIMETRIC DETECTION SENSOR AND SELECTIVE COLORIMETRIC DETECTION METHOD FOR DETECTING HEXAVALENT CHROMIUM IONS USING SIZE CONTROLLED LABEL-FREE GOLD NANOPARTICLES

CROSS-REFERENCE TO RELATED APPLICATION

This application claims the priority of Korean Patent Application No. 10-2015-0109660, filed on Aug. 3, 2015, and all the benefits accruing therefrom under 35 U.S.C. § 119, the contents of which in its entirety are herein incorporated by reference.

BACKGROUND

1. Field

The present disclosure relates to a selective colorimetric detection sensor and a selective colorimetric detection method for $Cr^{6+}$ ions using size controlled label-free gold nanoparticles.

2. Description of the Related Art

Chromium has been used in the processes of various industrial sectors, such as electroplating, alloying, fixing pigment, and film corrosion protection. Among the existing chromium ion analysis methods, the method of analyzing chromium which is a toxic material to the human body in the environmental sector plays a very important part. Chromium is present in two oxidation states of trivalent chromium ($Cr^{3+}$) and hexavalent chromium ($Cr^{6+}$) in an aqueous solution. In particular, $Cr^{6+}$ ions, which are in the highest oxidation state, are carcinogenic and very toxic, and thus are known as a metal ion material which is responsible for occupational hazards. International Agency for Research on Cancer (IARC) reported $Cr^{6+}$ ions as a major carcinogen that causes cancers such as lung cancer and nasal cavity cancer etc., and U.S. Environmental Protection Agency (EPA) classified $Cr^{6+}$ ions into Human Carcinogen Group A. In contrast, $Cr^{3+}$ ions are a glucose tolerance factor, and are known as a very important trace element in the human body. For example, diabetes is also a major symptom of a severe deficiency of chromium [Chron. Dis. 15 (1962) 941-964]. However, excessive $Cr^{3+}$ ions are bound to DNA in vivo to adversely affect cell structures and cell constituent components.

Numerous studies and analyses have been required for these chromium ions, and the reason is, first, because the analysis method of chromium ions has not been established. Second, the interaction between chromium and digestion factors has not been fully elucidated, and third, the diagnosis of the oxidation state of chromium ions is incorrect.

For the analysis according to the oxidation state of chromium ions, various analysis apparatuses and analysis methods have been used. For examples, atomic absorption spectrometry (AAS), ion couple plasma-mass spectrometry (ICP-MS), electrochemical analyzer (electrochemistry), classical color change observation (EPA 7196A method and EPA 3060A method), and the like are used for very sensitive and accurate analysis. However, there are disadvantages in that these methods require a lot of time and costs, their procedures are not simple, and the help of experts is needed for the analysis.

Further, these analysis methods generally reduce $Cr^{6+}$ ions to $Cr^{3+}$ ions and perform an analysis using a total amount of chromium, and a pretreatment method requiring a lot of time and technology needs to be used in order to perform a selective analysis by differentiating $Cr^{6+}$ ions from $Cr^{3+}$ ions.

The assembling and aggregation reactions of gold nanoparticles (AuNPs) result from the localized surface plasmon resonance (LSPR) of nanoparticles. Numerous studies for conveniently measuring various materials on-site have been conducted by utilizing the phenomenon of gold nanoparticles in detection sensors. The assembling and aggregation of gold nanoparticles may occur while the average distance between nanoparticles is reduced, and as a result, the color is changed. The color change may be observed by the naked eye, or may be observed using a UV-vis apparatus and a fluorescence apparatus (Fluorometer) to measure the absorbance. In addition, if nanoparticles are modified, the color is changed due to the surface plasmon resonance phenomenon when the nanoparticles are bound to specific molecules, so that studies have been conducted in many sectors such as the biochemical test and the detection of metal ions because such color change may be applied to a recognition system of specific molecules.

Professor Xhu Hongjun at Nanjing University, China developed a technology in which $Cr^{3+}$ ions are measured by modifying gold nanoparticles with N-benzyl-N-4-(pyridin-4-ylmethyl)phenyl dithiocarbamate (BP-DTC). However, a basis for separately measuring $C^{6+}$ ions is not disclosed [Analytica Chimica Acta 731(2012) 75-81].

Professor Yuhye Lin at Jinan University, China developed a method of analyzing each of $Cr^{6+}$ ions and $Cr^{3+}$ ions using an immunochromatographic assay in which monoclonal antibodies are used in gold nanoparticles [Analytica Chimica Acta 745(2012) 99-105]. Further, Professor Larettna in India developed a method of detecting $Cr^{6+}$ ions by an electrochemical method using gold nanoparticles. Youn Liu and Xianxiang Wang in China differentiated $Cr^{6+}$ ions from $Cr^{3+}$ ions using gold nanoparticles [Anal. Method, 2013, 5, 1442]. $Cr^{3+}$ ions were differentiated through coordination with citrate, and $Cr^{6+}$ ions were detected by being reduced to $Cr^{3+}$ ions. This is a method of calculating and quantifying the total amount of $Cr^{3+}$ ions and the amount of $Cr^{6+}$ ions reduced.

SUMMARY

In an aspect, the present disclosure is directed to providing a detection sensor and detection method which may selectively detect only $Cr^{6+}$ ions which are highly toxic to the human body unlike the existing detection sensor which detect both $Cr^{3+}$ and $Cr^{6+}$ by binding a ligand for detecting chromium ions to nanoparticles.

In other aspect, the present disclosure is directed to providing a colorimetric detection sensor and detection method which may have a simple experimental process compared to the existing methods, and thus may conveniently detect chromium ions, may more sensitively and precisely measure the $Cr^{6+}$ concentration than the existing sensors, and have no interference effect resulting from other metal ions by finding out an optimal condition for the detection through the size control of nanoparticles, the purification of prepared nanoparticles, the elucidation of the reaction mechanism, and the like while using label-free nanoparticles to which a ligand is not bound, unlike the existing detection sensors.

In exemplary embodiments, provided is a selective colorimetric detection sensor for detecting $Cr^{6+}$ ions using label-free gold nanoparticles including gold nanoparticles with a diameter of 20 to 80 nm. In an exemplary embodiment, the gold nanoparticles have preferably a diameter of 25 to 75 nm. When the gold nanoparticles have a diameter of less than 20 nm, the gold nanoparticles may not be reacted with $Cr^{6+}$ ions, so that the color change does not occur, and when the diameter exceeds 80 nm, there may be a problem in that the selectivity deteriorates because $Cr^{3+}$ ions are also reacted in addition to $Cr^{6+}$ ions.

In exemplary embodiments, provided is a method for preparing a selective detection sensor for detecting $Cr^{6+}$ ions, the method including: mixing chloroauric acid ($HAuCl_4$) and sodium citrate at a molar ratio (sodium citrate/chloroauric acid) of 27 to 43 to obtain gold nanoparticles; and performing centrifugation in order to remove unreacted sodium citrate after the reaction, removing a supernatant, and then replenishing distilled water.

In exemplary embodiments, provided is a selective colorimetric detection method for detecting $Cr^{6+}$ ions, the method including: an introducing step of introducing a sample to be detected into the colorimetric detection sensor as described above; and a sensing step of detecting $Cr^{6+}$ ions at a concentration of 0.05 ppm or more in the sample to be detected by a color change in the colorimetric detection sensor.

The selective colorimetric detection sensor and selective colorimetric detection may be very useful for the detection of toxic materials such as heavy metal ions in the environmental sector and the industry. By adjusting a molar ratio of sodium citrate and chloroauric acid which are reactants during the preparation of the colorimetric detection solution so as to control the size of label-free gold nanoparticles and as well removing unreacted sodium citrate after the reaction, a colorimetric sensor solution containing gold nanoparticles prepared may be selectively reacted with only $Cr^{6+}$ ions in trivalent chromium ions ($Cr^{3+}$) and hexavalent chromium ions ($Cr^{6+}$), an further there may be no interference effect resulting from other metal ions, and it may be possible to very rapidly and precisely detect $Cr^{6+}$ ions compared to the related art.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In exemplary embodiments, provided is a selective colorimetric detection sensor for detecting $Cr^{6+}$ ions using label-free gold nanoparticles including gold nanoparticles with a diameter of 20 to 80 nm. In an exemplary embodiment, the gold nanoparticles have preferably a diameter of 25 to 75 nm. When the gold nanoparticles have a diameter of less than 20 nm, the gold nanoparticles may not be reacted with $Cr^{6+}$ ions, so that the color change does not occur, and when the diameter exceeds 80 nm, there may be a problem in that the selectivity deteriorates because $Cr^{3+}$ ions are also reacted in addition to $Cr^{6+}$ ions.

In an exemplary embodiment, the concentration of the gold nanoparticles is preferably 1 to 2 mM (mmol/L).

In an exemplary embodiment, the colorimetric detection sensor may detect $Cr^{6+}$ ions in a pH range of 5 to 7, and in particular, it is preferred to detect $Cr^{6+}$ ions at a pH of 6.

In an exemplary embodiment, the decolorization from a red color series occurs during the detection of $Cr^{6+}$ ions, so that a color change into a transparent or very pale red color occurs.

In an exemplary embodiment, in the colorimetric detection sensor, a color change occurs without any interference effect resulting from other heavy metal ions such as $Cr^{3+}$, $Al^{3+}$, $Pb^{2+}$, $Ti^{3+}$, $Fe^{3+}$, $Hg^{2+}$, $Ba^{2+}$, $As^{3+}$, $Co^{2+}$, $Ni$, $Ca^{2+}$, $Na^+$, $K^+$, $Cd^{2+}$, $Ge^{4+}$, $Mn^{2+}$, $Sn^{2+}$, $Mg^{2+}$, $Ga^{3+}$, $Cu^{2+}$, $Li^+$, and $Zn^{2+}$ during the detection of $Cr^{6+}$ ions.

In exemplary embodiments, provided is a method for preparing a selective detection sensor for detecting $Cr^{6+}$ ions, the method including:

mixing chloroauric acid ($HAuCl_4$) and sodium citrate at a molar ratio (sodium citrate/chloroauric acid) of 27 to 43 to obtain gold nanoparticles; and performing centrifugation in order to remove unreacted sodium citrate after the reaction, removing a supernatant, and then replenishing distilled water.

When the molar ratio of sodium citrate to chloroauric acid is less than 27, the size of prepared nanoparticles is increased, so that there may be a problem in that $Cr^{6+}$ ions and $Cr^{3+}$ ions are all reacted, and when the molar ratio is more than 43, the size of obtained nanoparticles is so small that the nanoparticles may not be reacted with $Cr^{6+}$ ions and the color change may not occur.

As described above, the higher the content of sodium citrate becomes, the more likely the size of particles is to be decreased, and this tendency is because sodium citrate anions of sodium citrate reduce gold nanoparticles, and thus are largely affected by the content and molar ratio of citric acid. As the content of a reducing agent citric acid is relatively increased compared to the content of gold, the nucleation ratio of particles is increased, thereby resulting in a decrease in the average size of the particles. Further, the citric acid anions serve as a capping agent of nanoparticles, and thus may greatly stabilize the particles.

In an exemplary embodiment, the method for preparing a colorimetric detection sensor according to the present disclosure may further increase the degree of purification by additionally repeating a purification step of removing unreacted sodium citrate two to three times. It is advantageous to remove the unreacted sodium citrate because the unreacted sodium citrate may be reacted with chromium hexavalent ions to be detected or other heavy metal ions so as to serve as interfering substances.

In exemplary embodiments, provided is a selective colorimetric detection method for detecting $Cr^{6+}$ ions, the method including: an introducing step of introducing a sample to be detected into the colorimetric detection sensor as described above; and a sensing step of detecting $Cr^{6+}$ ions at a concentration of 0.05 ppm or more in the sample to be detected by a color change in the colorimetric detection sensor.

The method may further include a concentration measuring step of measuring the color change of the colorimetric detection using a spectrophotometer, a fluorometer, or a colorimeter to quantify the concentration of $Cr^{6+}$ ions in the sample to be detected after the sensing step.

In an exemplary embodiment, a UV-vis absorption wavelength which the colorimetric detection sensor in the introducing step may exhibit may be in a range of 490 to 600 nm, and when $Cr^{6+}$ ions are present in the sample to be detected, a UV-vis absorption wavelength which the colorimetric detection sensor in the sensing step may exhibit may be in a range of 500 to 550 nm.

In an exemplary embodiment, when $Cr^{6+}$ ions are present in the sample to be detected in the sensing step, the absorbance of the colorimetric detection sensor may be in a range of 0.2 to 1.5.

As described above, the selective colorimetric detection sensor for detecting $Cr^{6+}$ ions using label-free gold nanoparticles according to the present disclosure has an advantage in that $Cr^{6+}$ ions may be selectively measured with convenience and rapidity without being subjected to complex processes of expensive analysis apparatuses and a sample pretreatment, which require analysis by experts, such as using ICP-MS and AAS. Further, the selective colorimetric detection sensor is very useful for the measurement of $Cr^{6+}$ ions which are highly toxic by being selectively reacted with only $Cr^{6+}$ ions in $Cr^{6+}$ and $Cr^{3+}$ which are two oxidation forms of chromium. In addition, since label-free nanoparticles are prepared without attachment of a ligand, the use of chemicals may be reduced. Furthermore, the colorimetric detection method using the colorimetric detection sensor of the present disclosure may rapidly and economically perform the measurement, and in particular, a reliable result may be derived on-site at real time.

Hereinafter, the present disclosure will be described in detail through examples. However, the following examples are for illustrative purposes only and it will be apparent to those of ordinary skill in the art that the scope of the present disclosure is not limited by the examples.

Preparation Example 1: Preparation of Colorimetric Sensor Solution Including Label-Free Gold Nanoparticles 20 mg of chloroauric acid ($HAuCl_4$) is put into 50 ml of distilled water and refluxed while being boiled. 67, 62, 57, 52, 47, 42, and 37 mg of sodium citrate are dissolved respectively in 5 ml of distilled water according to the Nos. as listed in the following Table 1, and then the resulting solution is added to the chloroauric acid solution using a syringe. Herein, the volume ratio of the aqueous chloroauric acid solution and the aqueous sodium citrate solution is 10:1 (50 ml:5 ml). When sodium citrate is added thereto, it is confirmed that the color is changed to the wine color, and reflux is further performed for 15 minutes, and then the solution is cooled at normal temperature. The pH of the prepared colorimetric sensor solution is 6. The average size of nanoparticles according to the amount of sodium citrate added is shown in the following Table 1.

TABLE 1

| No. | Sodium citrate/Chloroauric acid (molar ratio) | Average particle size (nm) |
| --- | --- | --- |
| 1 | 44.0 | 14 |
| 2 | 40.8 | 26 |
| 3 | 37.4 | 39 |
| 4 | 34.2 | 50 |
| 5 | 30.8 | 62 |
| 6 | 27.6 | 78 |
| 7 | 24.3 | 95 |

Referring to Table 1, the size of gold nanoparticles in Sample No. 1 is 14 nm, the size of gold nanoparticles in Sample No. 7 is 95 nm, and it can be confirmed therefrom that the smaller the content of sodium citrate is, the larger the particle size is.

Preparation Example 2: Removal of Unreacted Residues and Effects Thereof

Unreacted sodium citrate is removed from the gold nanoparticle solution obtained in Preparation Example 1 using a centrifugal method. Herein, centrifuge is performed at 4,000 rpm for 20 minutes, the supernatant is removed, and then distilled water is replenished.

Figure 4A:
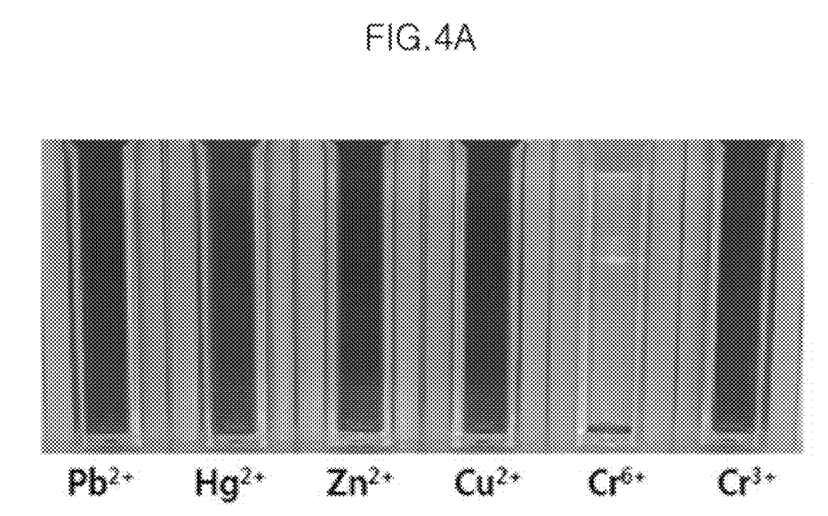
FIG. 4A is a photograph of the case where purification (removal of an unreacted residue sodium citrate) is performed one time in Preparation Example 2.
Figure 4B:
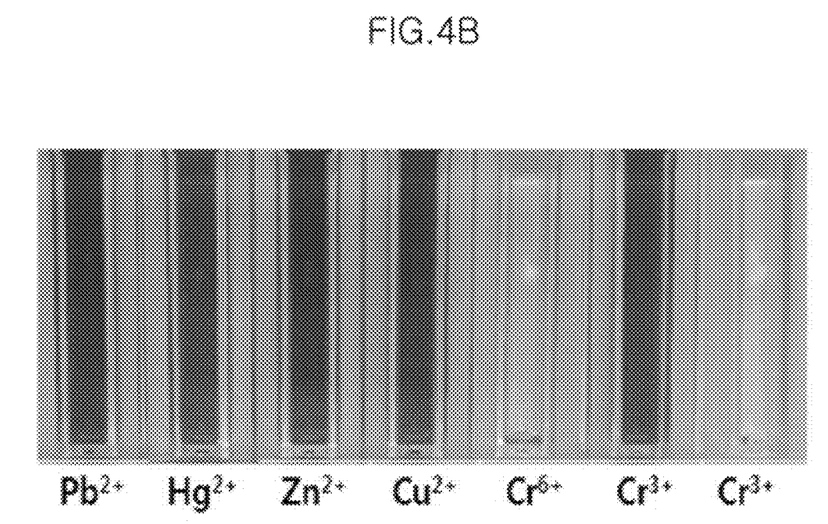
FIG. 4B is a photograph of the case where purification is performed four times in Preparation Example 2.
Figure 4C:
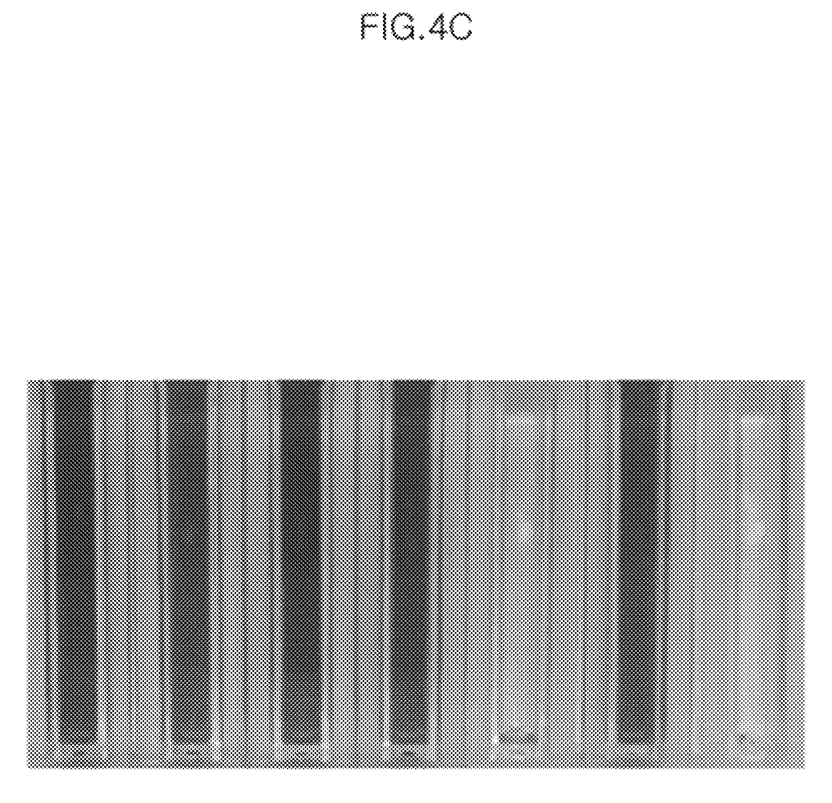
FIG. 4C is a photograph of the case after heavy metal ions are added when purification is not performed in Preparation Example 2.

In order to test the selectivity for $Cr^{6+}$ before and after the removal of unreacted sodium citrate, 0.5 ppm of $Cr^{3+}$ is added to 1 ml of Sample Nos. 2 to 6 before the purification, and the results are shown in FIG. 4C.

Further, $Pb^{2+}$, $Hg^{2+}$, $Zn^{2+}$, $Cu^{2+}$, $Cr^{6+}$, □ and $Cr^{3+}$ are added respectively to 1 ml of Sample No. 3 after purification is performed one time so as to become 0.5 ppm, and the result is shown in FIG. 4A. The metal ions are also added to the sample purified four times by the same method, and the result is shown in FIG. 4B.

When purification is not performed (FIG. 4C), unreacted sodium citrate served as an interfering substance in all the Sample Nos. 2 to 6, and thus is reacted with $Cr^{3+}$ ions to obtain a transparent color, whereas when purification is performed one time and four times (FIGS. 4A and 4B), $Cr^{3+}$ ions are not reacted, and only $Cr^{6+}$ ions are reacted with label-free gold nanoparticles to obtain a transparent color.

Example 1: Experiment of Selectivity for $Cr^{6+}$ ions

The seven colorimetric sensor solutions obtained in Preparation Example 1 are purified one time by the method in Preparation Example 2, and then $Cr^{6+}$ ions and $Cr^{3+}$ ions are added to each colorimetric sensor solution so as to become 0.5 ppm, respectively. It is shown in the following Table 2 whether the colorimetric sensor solution is reacted with each chromium ion (O: reacted, X: unreacted).

TABLE 2

| No. | Average particle size (nm) | Whether being reacted with $Cr^{3+}$ ions | Whether being reacted with $Cr^{6+}$ ions |
|---|---|---|---|
| 1 | 14 | X | X |
| 2 | 26 | X | O |
| 3 | 39 | X | O |
| 4 | 50 | X | O |
| 5 | 62 | X | O |
| 6 | 78 | X | O |
| 7 | 95 | O | O |

Figure 1:
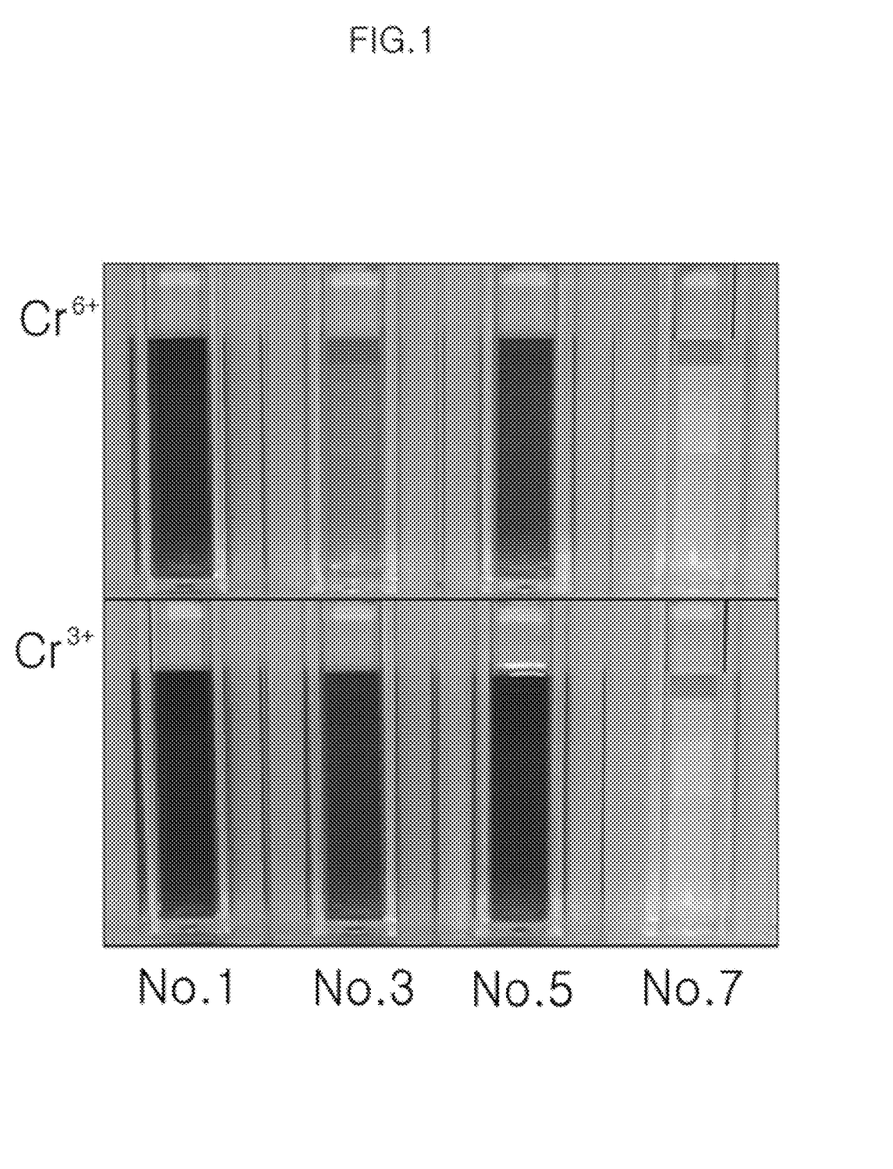
FIG. 1 is a photograph illustrating the selectivity for $Cr^{6+}$ and $Cr^{3+}$ ions of the colorimetric sensor solutions according to the concentration of sodium citrate in Example 1.

Referring to Table 2 and FIG. 1, in Sample No. 1, the color change does not occur because none of $Cr^{6+}$ ions and $Cr^{3+}$ ions causes the reaction, and in Sample No. 2, $Cr^{3+}$ ions are not reacted, and only $Cr^{6+}$ ions are reacted. In Sample No. 7, both $Cr^{6+}$ ions and $Cr^{3+}$ ions are reacted, and thus are transparently changed. From the results of Table 2 and FIG. 1, it can be seen that the selectivity of reaction for $Cr^{6+}$ ions and $Cr^{3+}$ ions is determined by the size of label-free gold nanoparticles. It can be seen that when the size of particles is 15 nm or less, both $Cr^{6+}$ ions and $Cr^{3+}$ ions are unreacted, but when the size is 26 to 78 nm, only $Cr^{6+}$ ions are selectively bound to label-free gold nanoparticles.

Figure 2A:
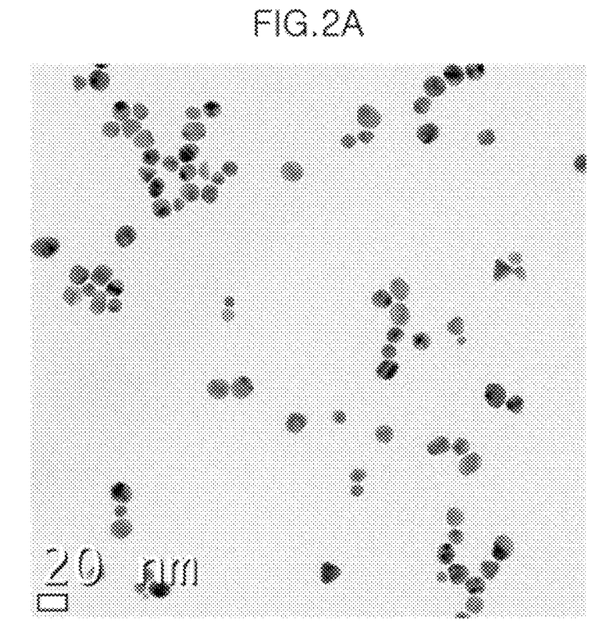
FIG. 2A is a transmission electron microscope photograph of label-free gold nanoparticles in Example 1.
Figure 2B:
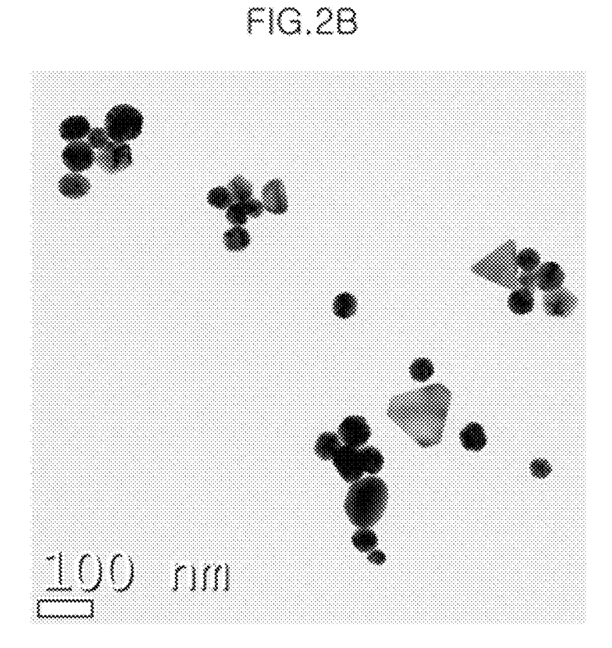
FIG. 2B is a transmission electron microscope photograph of label-free gold nanoparticles after the addition of $Cr^{3+}$ in Example 1.
Figure 2C:
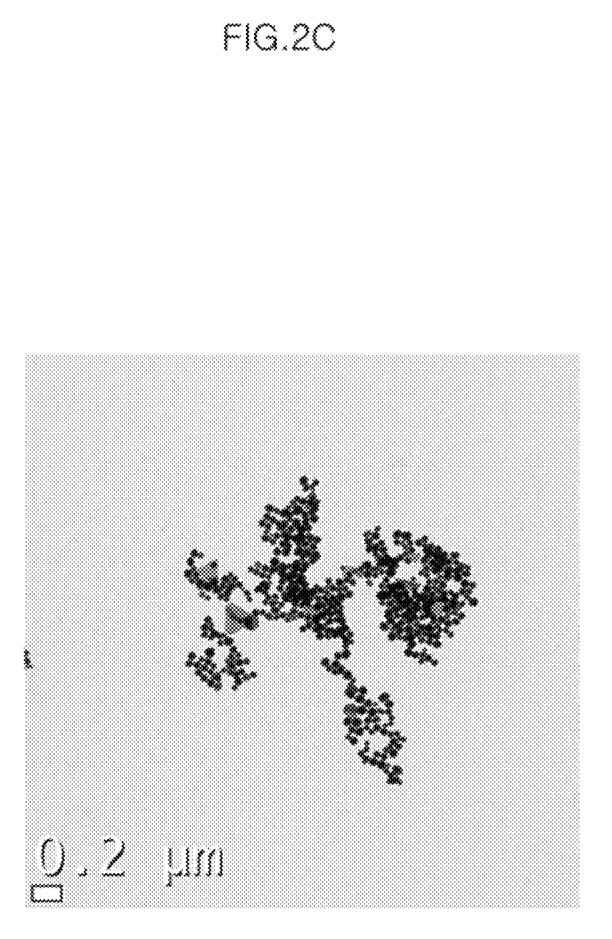
FIG. 2C is a transmission electron microscope photograph of label-free gold nanoparticles after the addition of $Cr^{6+}$ in Example 1.

FIG. 2A is a transmission electron microscope photograph after Sample No. 3 was purified one time by the method in Preparation Example 2, FIG. 2B is a photograph when $Cr^{3+}$ ions were added thereto, and FIG. 2C is a photograph when $Cr^{6+}$ ions were added thereto. Referring to FIG. 2A, it can be seen that label-free gold nanoparticles (AuNPs) are entirely uniformly distributed without being aggregated, and even when $Cr^{3+}$ is added thereto, nanoparticles are uniformly distributed without being aggregated (see FIG. 2B). However, it can be seen that gold nanoparticles are bound to each other and aggregated when $Cr^{6+}$ is added thereto (see FIG. 2C).

Figure 3:
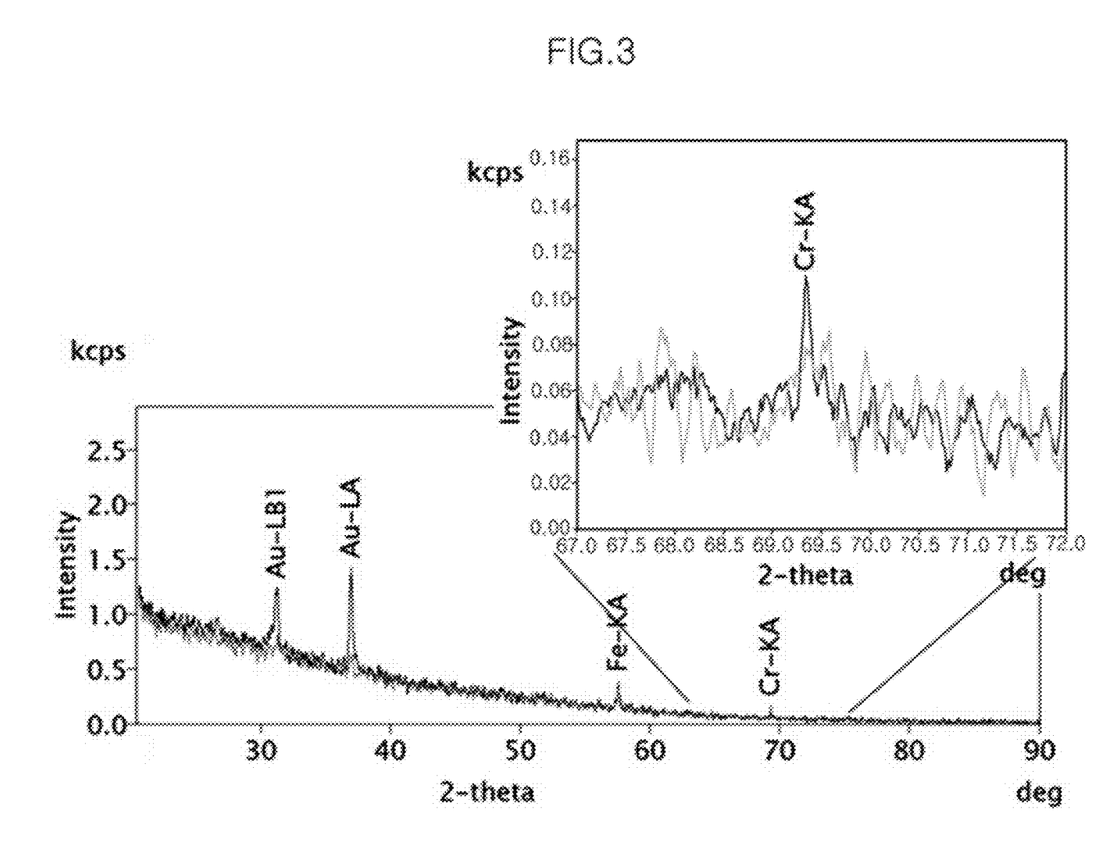
FIG. 3 is an XRF spectrum before $Cr^{6+}$ is added to a colorimetric sensor solution (grey line) and after $Cr^{6+}$ is added to the colorimetric sensor solution (black line) in Example 1.

FIG. 3 is an X-ray fluorescence (XRF) spectrum of Sample No. 3 before and after the addition of $Cr^{6+}$ according to the present disclosure, the grey line is a spectrum before the addition of $Cr^{6+}$, the black line is a spectrum after the addition of $Cr^{6+}$, and the small graph in the drawing is the enlarged Cr-Ka peak portion in order to show the difference between the grey line and the black line in detail. It can be confirmed that gold nanoparticles to which $Cr^{6+}$ is bound has a peak at 2θ=69.5 degrees (black line), but label-free gold nanoparticles to which $Cr^{6+}$ is not bound has no peak at the corresponding position (grey line). Since the XRF measuring apparatus inherently has a disadvantage in that $Cr^{3+}$ may not be differentiated from $Cr^{6+}$, it is further proved that the embodiments of the present disclosure are excellent.

Example 2: Experiment of Selectivity for Various Heavy Metal Ions

Figure 5:
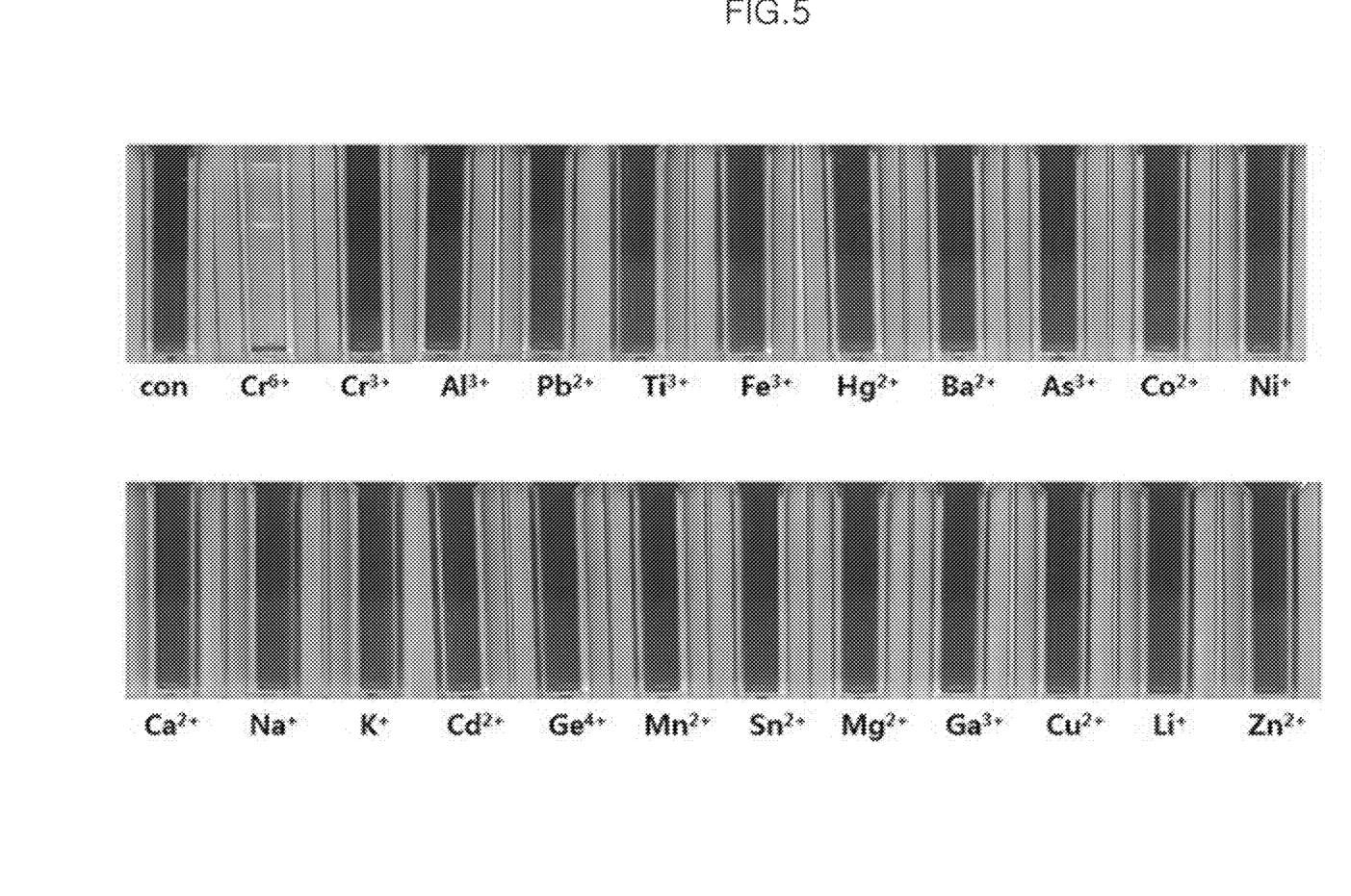
FIG. 5 is a photograph after various heavy metal ions are added to the colorimetric sensor solution in order to exhibit the selectivity for $Cr^{6+}$ ions in Example 2.

Sample No. 3 obtained in Preparation Example 1 is purified one time by the method in Preparation Example 2, and then 50 μL of heavy metal ions ($Cr^{6+}$, $Cr^{3+}$, $Al^{3+}$, $Pb^{2+}$, $Ti^{3+}$, $Fe^{3+}$, $Hg^{2+}$, $Ba^{2+}$, $As^{3+}$, $Co^{2+}$, Ni, $Ca^{2+}$, $Na^+$, $K^+$, $Cd^{2+}$, $Ge^{4+}$, $Mn^{2+}$, $Sn^{2+}$, $Mg^{2+}$, $Ga^{3+}$, $Cu^{2+}$, Li, and $Zn^{2+}$) at 10 ppm are added to 0.95 ml of the sample, so that the concentration is allowed to become 0.5 ppm. The result is shown as a photograph in FIG. 5, and among the ions, only $Cr^{6+}$ ions are selectively reacted, so that the red color is transparently changed. Accordingly, it can be seen that the colorimetric sensor solution according to the embodiments of the present disclosure is excellent in selectivity for $Cr^{6+}$ among various heavy metals.

Example 3: Interference Effect Experiment of Other Heavy Metal Ions

The present Example is about an experiment to observe whether other heavy metals interfere with the measurement of $Cr^{6+}$ ions when $Cr^{6+}$ ions are simultaneously present with other heavy metal ions.

Figure 6A:
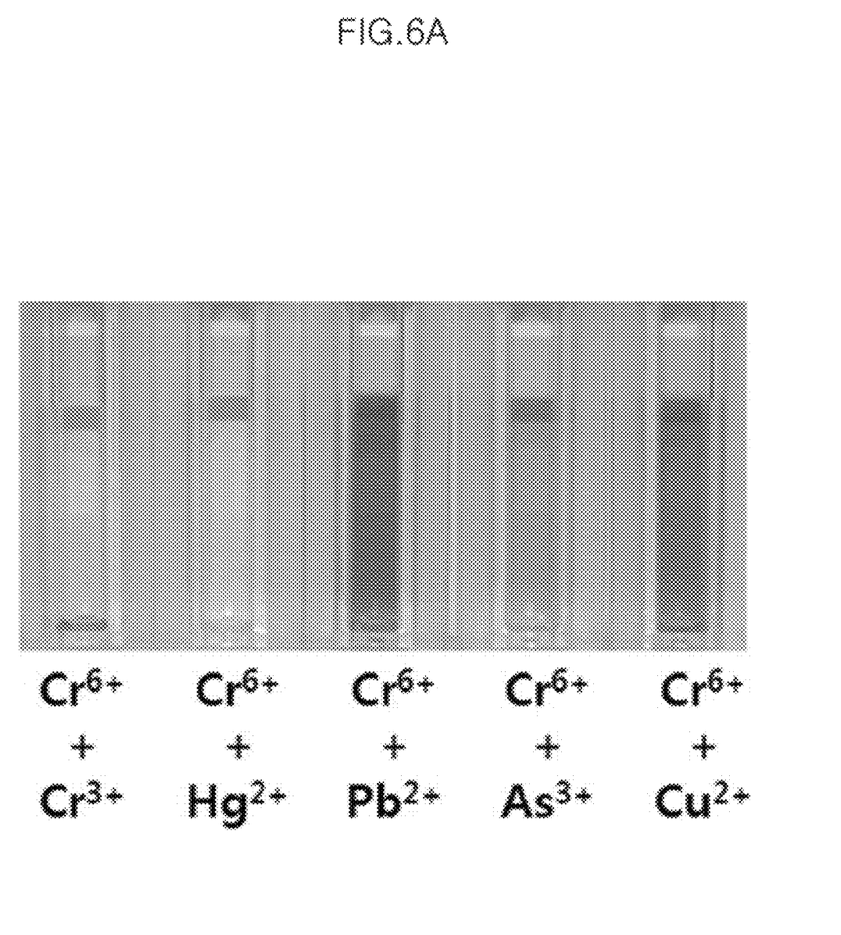
FIG. 6A is a photograph of the case where $Cr^{6+}$ ions are simultaneously present with other heavy metal ions in the colorimetric sensor solution in Example 3.

Sample No. 3 obtained in Preparation Example 1 is purified one time by the method in Preparation Example 2, and then two types of ions such as $Cr^{6+}$ and $Cr^{3+}$, $Cr^{6+}$ and $Hg^{2+}$, $Cr^{6+}$ and $Pb^{2+}$, $Cr^{6+}$ and $As^{3+}$, and $Cr^{6+}$ and $Cu^{2+}$ are added to 1 ml of each sample so as to become 0.5 ppm, and the result is shown in FIG. 6A.

Figure 6B:
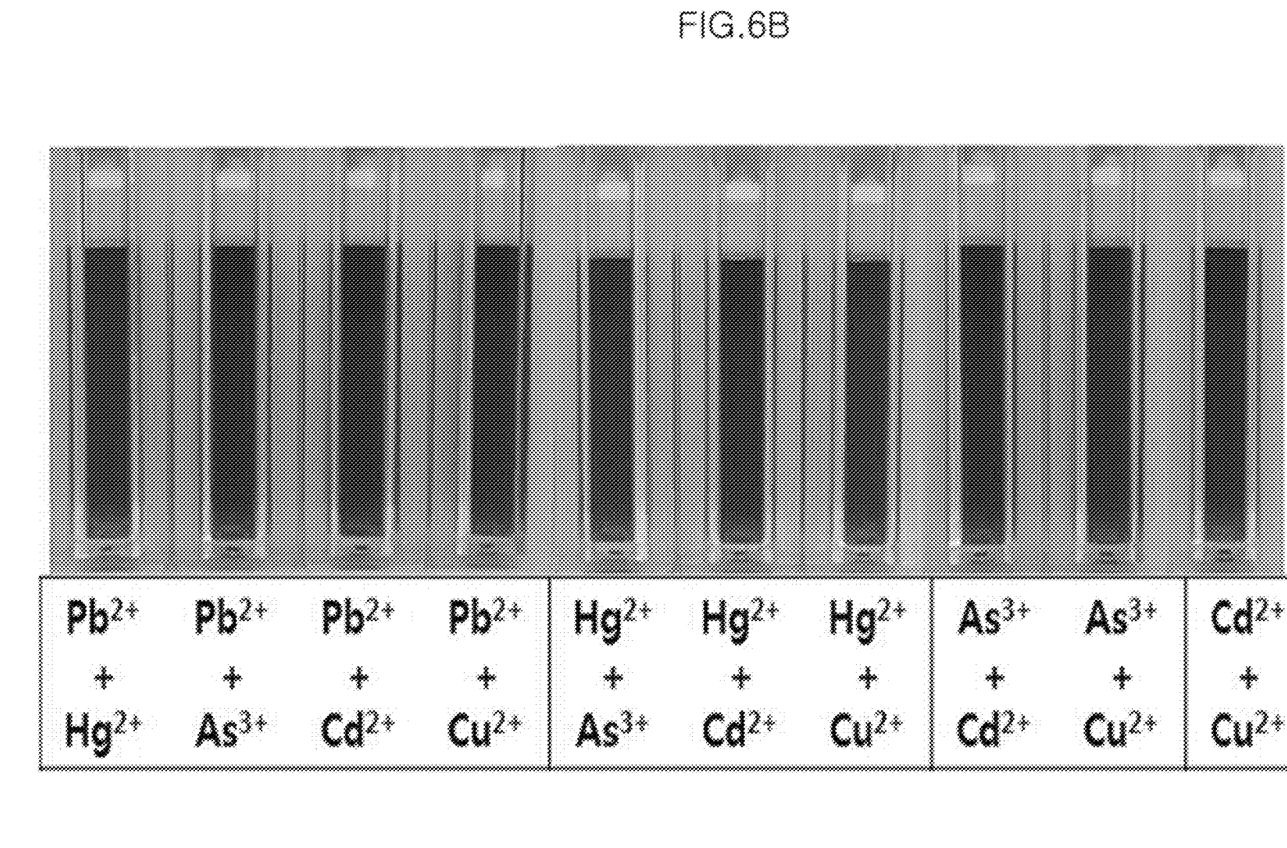
FIG. 6B is a photograph of the case where two other heavy metal ions except for $Cr^{6+}$ ions are present in combination in the colorimetric sensor solution in Example 3.

Meanwhile, two types of metal ions ($Pb^{2+}$, $Hg^{2+}$, $As^{3+}$, $Cd2^+$, and $Cu^{2+}$) except for $Cr^{6+}$ ions are variously combined and added to the same sample, and the color change is observed (FIG. 6B).

From the result in FIG. 6A, it can be seen that even though $Cr^{6+}$ ions co-exist with other metal ions, the color of the colorimetric sensor solution is transparently changed likewise as when $Cr^{6+}$ ions are present alone. The combinations of the metal ions except for $Cr^{6+}$ ions are all unreacted, and do not change the color of the colorimetric sensor solution (FIG. 6b).

Example 4: $Cr^{6+}$ ion Measurement Experiment and Detection of Limit

For the colorimetric sensor solution according to the embodiments of the present disclosure, a calibration curve for quantifying $Cr^{6+}$ ions and a correlation coefficient are measured.

$Cr^{6+}$ ions are added to 1 ml of the colorimetric sensor solution obtained by purifying Sample No. 3 obtained in Preparation Example 1 one time by the method in Preparation Example 2 so as to become 0 and 0.1 to 0.5 ppm, and the absorbance is measured at 535 nm using a UV-vis spectrophotometer.

As the concentration of $Cr^{6+}$ ions is increased, the reaction of label-free gold nanoparticles with $Cr^{6+}$ ions, aggregation, and precipitation are more likely to occur, so that it can be seen that the color of the solution is changed proportionally.

A quantitative graph is drawn using the measurement result of the UV-vis spectrophotometer. At an absorption wavelength of 535 nm, the regression curve is y=−0.2257x+ 1.1067, and the correlation coefficient $r^2$=0.9947, which are excellent results.

The detection of limit (LOD) can be obtained using 3 m/sD (slope/standard deviation) from the quantitative curve, and the value is 0.05 ppm or less.

What is claimed is:

1. A selective colorimetric detection sensor for detecting $Cr^{6+}$ ions using spherical gold nanoparticles comprising: a spherical gold nanoparticle with a diameter of 50 to 78 nm, wherein the spherical gold nanoparticle having the diameter is selectively reacted with only $Cr^{6+}$ ions in $Cr^{6+}$ ions and $Cr^{3+}$ ions;
   wherein a concentration of the spherical gold nanoparticle is 1 to 2 mM (mmol/L) and
   wherein the colorimetric detection sensor detects $Cr^{6+}$ ions in a pH range of 5 to 7.

2. The selective colorimetric detection sensor according to claim 1, wherein a decolorization from a red color series in the colorimetric detection sensor occurs during the detection of $Cr^{6+}$ ions, so that a color change into a transparent or pale red color occurs.

3. The selective colorimetric detection sensor according to claim 1, wherein in the colorimetric detection sensor, a color change occurs without an interference effect resulting from other heavy metal ion during the detection of $Cr^{6+}$ ions.

4. The selective colorimetric detection sensor according to claim 3, wherein the other heavy metal ion is at least one selected from the group consisting of $Cr^{3+}$, $Al^{3+}$, $Pb^{2+}$, $Ti^{3+}$, $Fe^{3+}$, $Hg^{2+}$, $Ba^{2+}$, $As^{3+}$, $Co^{2+}$, $Ni+$, $Ca^{2+}$, $Na+$, $K+$, $Cd^{2+}$, $Ge^{4+}$, $Mn^{2+}$, $Sn^{2+}$, $Mg^{2+}$, $Ga^{3+}$, $Cu^{2+}$, $Li^+$, and $Zn^{2+}$.

5. A colorimetric detection method for detecting $Cr^{6+}$ ions, the method comprising:
   an introducing step of introducing a sample to be detected into the colorimetric detection sensor according to claim 1; and
   a sensing step of detecting $Cr^{6+}$ ions at a concentration of 0.05 ppm or more in the sample to be detected by a color change in the colorimetric detection sensor.

6. The method according to claim 5, further comprising a concentration measuring step of measuring the color change of the colorimetric detection using a spectrophotometer, a fluorometer, or a colorimeter to quantify the concentration of $Cr^{6+}$ ions in the sample to be detected after the sensing step.

7. The method according to claim 5, wherein a UV-vis absorption wavelength which the colorimetric detection sensor in the introducing step exhibits is in a range of 490 to 600 nm, and when $Cr^{6+}$ ions are present in the sample to be detected, a UV-vis absorption wavelength which the colorimetric detection sensor in the sensing step exhibits is in a range of 500 to 550 nm.

8. The method according to claim 5, wherein when $Cr^{6+}$ ions are present in the sample to be detected in the sensing step, an absorbance of the colorimetric detection sensor is in a range of 0.2 to 1.5.

* * * * *